United States Patent
Kuo et al.

(10) Patent No.: US 9,915,810 B2
(45) Date of Patent: Mar. 13, 2018

(54) PROJECTION APPARATUS AND PROJECTION LENS WITH THREE LENS GROUPS

(71) Applicant: Coretronic Corporation, Hsin-Chu (TW)

(72) Inventors: Tao-Hung Kuo, Hsin-Chu (TW); Hsin-Wen Tsai, Hsin-Chu (TW); Ching-Chuan Wei, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/135,531

(22) Filed: Apr. 21, 2016

(65) Prior Publication Data

US 2016/0313542 A1   Oct. 27, 2016

(30) Foreign Application Priority Data

Apr. 24, 2015   (TW) .............................. 104113216 A

(51) Int. Cl.
*G02B 15/15* (2006.01)
*G02B 15/163* (2006.01)
(Continued)

(52) U.S. Cl.
CPC ........... *G02B 15/163* (2013.01); *G02B 13/16* (2013.01); *G02B 15/15* (2013.01); *G02B 15/155* (2013.01);
(Continued)

(58) Field of Classification Search
CPC ...... G02B 13/16; G02B 15/177; G02B 15/14; G02B 15/15; G02B 15/155; G02B 15/16;
(Continued)

(56) References Cited

U.S. PATENT DOCUMENTS 5,805,350 A   9/1998 Yamamoto
6,075,653 A   6/2000 Narimatsu et al.
(Continued)

FOREIGN PATENT DOCUMENTS

JP   2009527013   7/2009
JP   2014219535   11/2014
TW   201250278   12/2012

OTHER PUBLICATIONS

"Notice of Allowance of Taiwan Counterpart Application", dated Feb. 22, 2016, p. 1-p. 3, in which the listed foreign patent references were cited.

*Primary Examiner* — Bao-Luan Le

(74) *Attorney, Agent, or Firm* — JCIPRNET

(57) ABSTRACT

A projection lens and a projection apparatus are provided. The projection lens has a screen side and an image side. The projection lens includes a first lens group, a second lens group, and a third lens group. The first lens group disposed between the screen side and the image side includes a first, a second, and a third lenses arranged sequentially from the screen side to the image side. The second lens group disposed between the first lens group and the image side includes a fourth, a fifth, a sixth, a seventh, an eighth, a ninth, and a tenth lenses arranged sequentially from the screen side to the image side. The third lens group disposed between the second lens group and the image side includes an eleventh and a twelfth lenses, and a distance between the twelfth lens and the light valve is a constant.

16 Claims, 20 Drawing Sheets

(51) Int. Cl.
  *G02B 13/16* (2006.01)
  *G02B 15/167* (2006.01)
  *G02B 15/20* (2006.01)
  *G02B 15/173* (2006.01)
  *G02B 15/17* (2006.01)
  *G02B 15/16* (2006.01)
  *G02B 15/177* (2006.01)

(52) U.S. Cl.
  CPC ........... *G02B 15/16* (2013.01); *G02B 15/167* (2013.01); *G02B 15/17* (2013.01); *G02B 15/173* (2013.01); *G02B 15/177* (2013.01); *G02B 15/20* (2013.01)

(58) Field of Classification Search
  CPC .... G02B 15/163; G02B 15/167; G02B 15/17; G02B 15/173; G02B 15/20; G03B 21/142; G03B 21/147; G03B 21/28
  See application file for complete search history.

(56) References Cited

U.S. PATENT DOCUMENTS

| | | | | |
|---|---|---|---|---|
| 7,401,929 B2* | 7/2008 | Matsumoto | ............ | G06T 5/006 348/745 |
| 7,771,055 B2* | 8/2010 | Matsumoto | ............ | G06T 5/006 348/745 |
| 8,142,029 B2* | 3/2012 | Matsumoto | ............ | G06T 5/006 348/745 |
| 8,144,401 B2* | 3/2012 | Su | ............ | G02B 15/177 359/649 |
| 2005/0280780 A1* | 12/2005 | Matsumoto | ............ | G06T 5/006 353/70 |
| 2007/0013875 A1* | 1/2007 | Matsuoka | ............ | G03B 21/142 353/70 |
| 2008/0252860 A1* | 10/2008 | Matsumoto | ............ | G06T 5/006 353/70 |
| 2010/0033838 A1* | 2/2010 | Saori | ............ | G02B 15/20 359/684 |
| 2010/0238560 A1* | 9/2010 | Fujimoto | ............ | G02B 15/177 359/682 |
| 2010/0265469 A1* | 10/2010 | Matsumoto | ............ | G06T 5/006 353/70 |
| 2011/0194188 A1* | 8/2011 | Su | ............ | G02B 15/177 359/664 |
| 2012/0120484 A1* | 5/2012 | Konuma | ............ | G02B 13/16 359/364 |
| 2012/0147337 A1* | 6/2012 | Matsumoto | ............ | G06T 5/006 353/70 |
| 2012/0300313 A1* | 11/2012 | Wada | ............ | G02B 15/173 359/690 |
| 2013/0120640 A1* | 5/2013 | Taki | ............ | G02B 15/14 348/345 |
| 2013/0235466 A1* | 9/2013 | Iwamoto | ............ | G02B 13/009 359/683 |
| 2014/0118841 A1* | 5/2014 | Toyama | ............ | G02B 15/17 359/688 |
| 2014/0177067 A1* | 6/2014 | Saori | ............ | G02B 15/14 359/686 |
| 2014/0333821 A1* | 11/2014 | Hagiwara | ............ | G02B 15/173 348/345 |
| 2015/0241673 A1* | 8/2015 | Nagatoshi | ............ | G02B 15/167 359/683 |
| 2015/0241674 A1* | 8/2015 | Nagatoshi | ............ | G02B 15/14 359/683 |

\* cited by examiner

PROJECTION APPARATUS AND PROJECTION LENS WITH THREE LENS GROUPS

CROSS-REFERENCE TO RELATED APPLICATION

This application claims the priority benefit of Taiwan application serial no. 104113216, filed on Apr. 24, 2015. The entirety of the above-mentioned patent application is hereby incorporated by reference herein and made a part of this specification.

BACKGROUND OF THE INVENTION

Field of the Invention

The invention relates to an image apparatus and a lens, and particularly relates to a projection apparatus and a projection lens.

Description of Related Art

Along with development of science technology, image apparatus such as projection apparatus, digital video camera (DVC) and digital camera (DC) are widely used. One of core elements of the image apparatus is a zoom lens. Taking the projection apparatus as an example, during a zooming process, a distance between lens groups in the projection lens is adjusted and/or a distance between an image source (for example, a light valve) and a lens group closest to the image source is adjusted, so as to clearly project an image to a screen. However, when the distance between the image source and the lens group closest to the image source is changed (for example, enlarged), the lens group closest to the image source cannot completely cover an image beam coming from the image source, such that a part of the image beam is propagated to other element(s) outside the lens group, and such element(s) may absorb the energy of the image beam to cause a problem of overheating of the element(s).

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a projection apparatus and a projection lens, which may mitigate a problem that a lens group is unable to completely cover an image beam coming from an image source in the prior art.

Other objects and advantages of the invention can be further illustrated by the technical features broadly embodied and described as follows.

In order to achieve at least one of the objects or other objects, an embodiment of the invention provides a projection apparatus including an illumination system, a light valve, and a projection lens. The illumination system provides an illumination beam. The light valve is disposed on a transmission path of the illumination beam, and converts the illumination beam into an image beam. The projection lens is disposed on a transmission path of the image beam, and has a screen side and an image side. The projection lens includes a first lens group, a second lens group, and a third lens group. The first lens group is disposed between the screen side and the image side, and includes a first lens, a second lens, and a third lens arranged sequentially from the screen side to the image side. Refractive powers of the first lens, the second lens, and the third lens are sequentially negative, negative, and positive. The second lens group is disposed between the first lens group and the image side and has a positive refractive power, and the second lens group includes a fourth lens, a fifth lens, a sixth lens, a seventh lens, an eighth lens, a ninth lens, and a tenth lens arranged sequentially from the screen side to the image side. Refractive powers of the fourth lens, the fifth lens, the sixth lens, the seventh lens, the eighth lens, the ninth lens, and the tenth lens are sequentially positive, positive, negative, positive, positive, negative, and positive. The third lens group is disposed between the second lens group and the image side and has a positive refractive power, and the third lens group includes an eleventh lens and a twelfth lens arranged sequentially from the screen side to the image side. Refractive powers of the eleventh lens and the twelfth lens are sequentially positive and negative, and a distance between the twelfth lens and the light valve is a constant.

In order to achieve at least one of the objects or other objects, an embodiment of the invention provides a projection lens adapted to be disposed on a transmission path of an image beam from a light valve, and the projection lens has a screen side and an image side. The projection lens includes a first lens group, a second lens group, and a third lens group. The first lens group is disposed between the screen side and the image side, and includes a first lens, a second lens, and a third lens arranged sequentially from the screen side to the image side. Refractive powers of the first lens, the second lens, and the third lens are sequentially negative, negative, and positive. The second lens group is disposed between the first lens group and the image side and has a positive refractive power, and the second lens group includes a fourth lens, a fifth lens, a sixth lens, a seventh lens, an eighth lens, a ninth lens, and a tenth lens arranged sequentially from the screen side to the image side. Refractive powers of the fourth lens, the fifth lens, the sixth lens, the seventh lens, the eighth lens, the ninth lens, and the tenth lens are sequentially positive, positive, negative, positive, positive, negative, and positive. The third lens group is disposed between the second lens group and the image side and has a positive refractive power, and the third lens group includes an eleventh lens and a twelfth lens arranged sequentially from the screen side to the image side. Refractive powers of the eleventh lens and the twelfth lens are sequentially positive and negative, and a distance between the twelfth lens and the light valve is a constant.

In an embodiment of the projection apparatus and the projection lens of the invention, the first lens group includes a first sub-lens group and a second sub-lens group. The first sub-lens group is composed of the first lens and the second lens. The second sub-lens group is composed of the third lens. Refractive powers of the first sub-lens group and the second sub-lens group are sequentially negative and positive.

In an embodiment of the projection apparatus and the projection lens of the invention, a distance between the second lens group and the third lens group at a wide-end is DWA, a distance between the second lens group and the third lens group at a tele-end is DTA, and $15.2<(DTA/DWA)<18$.

In an embodiment of the projection apparatus and the projection lens of the invention, the first lens group has a negative refractive power.

In an embodiment of the projection apparatus and the projection lens of the invention, a distance between the second lens group and the third lens group at a wide-end is DWB, a distance between the second lens group and the third lens group at a tele-end is DTB, and 15.5<(DTB/DWB)<18.5.

In an embodiment of the projection apparatus and the projection lens of the invention, the first lens is a convexo-concave lens with a convex surface facing the screen side. The second lens is a biconcave lens. The third lens is a biconvex lens. The fourth lens is a plano-convex lens with a convex surface facing the screen side. The fifth lens is a convexo-concave lens with a convex surface facing the screen side. The sixth lens is a biconcave lens. The seventh lens is a convexo-concave lens with a convex surface facing the screen side. The eighth lens is a plano-convex lens with a convex surface facing the image side. The ninth lens is a plano-concave lens with a concave surface facing the screen side. The tenth lens is a biconvex lens. The eleventh lens is a biconvex lens. The twelfth lens is a biconcave lens or a plano-concave lens with a concave surface facing the screen side.

In an embodiment of the projection apparatus and the projection lens of the invention, the sixth lens and the seventh lens construct a double cemented lens, and the eighth lens and the ninth lens construct another double cemented lens.

In an embodiment of the projection apparatus and the projection lens of the invention, the first lens and the tenth lens are aspheric lenses, and the second lens to the ninth lens, the eleventh lens, and the twelfth lens are spherical lenses.

In an embodiment of the projection apparatus and the projection lens of the invention, the projection lens further includes an aperture stop. The aperture stop is disposed between the ninth lens and the tenth lens.

According to the above descriptions, in the embodiments of the invention, the distance between the light valve and the twelfth lens closest to the light valve is maintained to a constant. Namely, the distance between the light valve and the twelfth lens closest to the light valve is not changed along with a variation of a focal length. Therefore, during a zooming process, it is ensured that the lens group (the third lens group) closest to an image source in the projection lens is capable of completely covering the image beam coming from the image source, so as to avoid a situation that an element/element(s) outside a lens group of a conventional projection apparatus absorbs the energy of the image beam to cause a problem of overheating of the element(s).

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
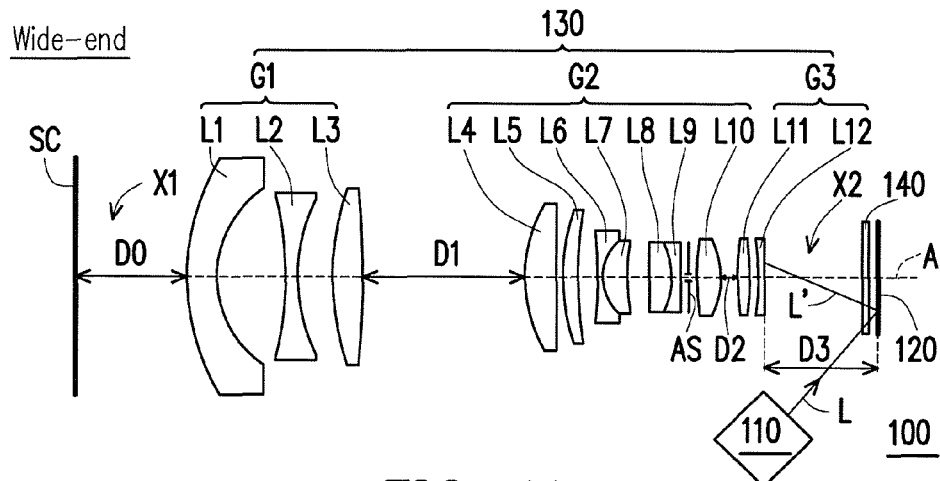
FIG. 1A to FIG. 1C are respectively schematic diagrams of a projection apparatus in a wide-end, a middle-end, and a tele-end according to a first embodiment of the invention.
Figure 1B:
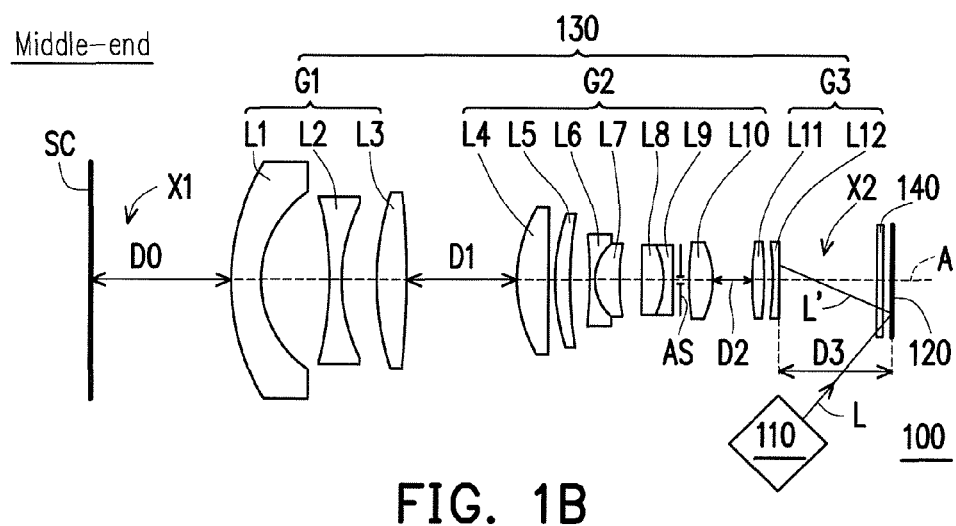
Figure 1C:
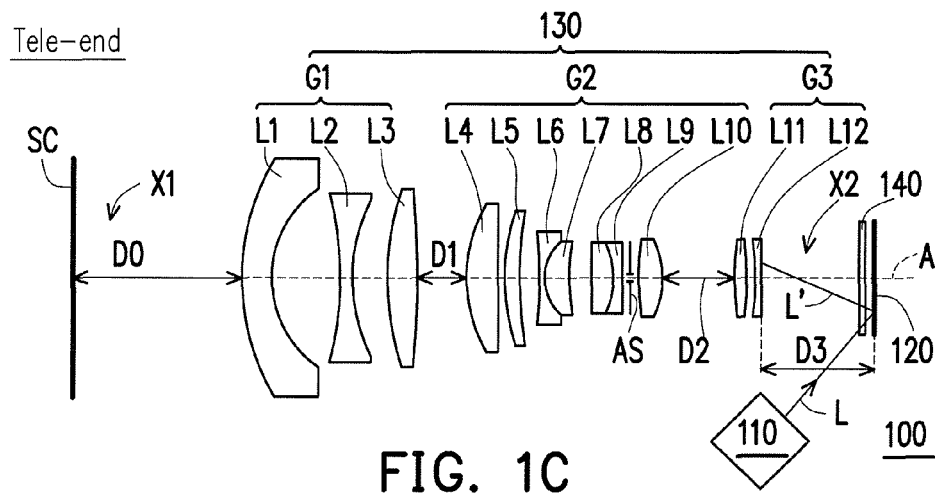

FIG. 1A to FIG. 1C are respectively schematic diagrams of a projection apparatus in a wide-end, a middle-end, and a tele-end according to a first embodiment of the invention.

Referring to FIG. 1A to FIG. 1C, a projection apparatus 100 includes an illumination system 110, a light valve 120, and a projection lens 130. The illumination system 110 provides an illumination beam L, and the illumination system 110 may be any system adapted to illuminate the light valve 120. The light valve 120 is disposed on a transmission path of the illumination beam L, and the light valve 120 converts the illumination beam L into an image beam L'. For example, the light valve 120 may be a digital micro-mirror device (DMD), a liquid-crystal-on-silicon panel (LCOS panel) or other suitable spatial light modulator (SLM). The projection lens 130 is disposed on a transmission path of the image beam L', and is used for projecting the image beam L' coming from the light valve 120 onto a screen SC, so as to form an image on the screen SC.

In the embodiment, the projection lens 130 has a screen side X1 and an image side X2 located between the screen side X1 and the light valve 120, though the invention is not limited thereto, and in other embodiments, the image side X2 may be a surface of the light valve 120. The projection lens 130 includes a first lens group G1, a second lens group G2, and a third lens group G3. The first lens group G1 of the embodiment is disposed between the screen side X1 and the image side X2, and has a negative refractive power. The first lens group G1 includes a first lens L1, a second lens L2, and a third lens L3 arranged sequentially from the screen side X1 to the image side X2. Refractive powers of the first lens L1, the second lens L2, and the third lens L3 are sequentially negative, negative, and positive. The first lens L1 may be a convexo-concave lens with a convex surface facing the screen side X1. The second lens L2 may be a biconcave lens. The third lens L3 may be a biconvex lens.

The second lens group G2 is disposed between the first lens group G1 and the image side X2, and has a positive refractive power. The second lens group G2 includes a fourth lens L4, a fifth lens L5, a sixth lens L6, a seventh lens L7, an eighth lens L8, a ninth lens L9, and a tenth lens L10 arranged sequentially from the screen side X1 to the image side X2. Refractive powers of the fourth lens L4, the fifth lens L5, the sixth lens L6, the seventh lens L7, the eighth lens L8, the ninth lens L9, and the tenth lens L10 are sequentially positive, positive, negative, positive, positive, negative, and positive. The fourth lens L4 may be a plano-convex lens with a convex surface facing the screen side X1. The fifth lens L5 may be a convexo-concave lens with a convex surface facing the screen side X1. The sixth lens L6 may be a biconcave lens. The seventh lens L7 may be a convexo-concave lens with a convex surface facing the screen side X1. The eighth lens L8 may be a plano-convex lens with a convex surface facing the image side X2. The ninth lens L9 may be a plano-concave lens with a concave surface facing the screen side X1. The tenth lens L10 may be a biconvex lens.

The third lens group G3 is disposed between the second lens group G2 and the image side X1, and has a positive refractive power. The third lens group G3 includes an eleventh lens L11 and a twelfth lens L12 arranged sequentially from the screen side X1 to the image side X2. Refractive powers of the eleventh lens L11 and the twelfth lens L12 are sequentially positive and negative. The eleventh lens L11 may be a biconvex lens. The twelfth lens L12 may be a plano-concave lens with a concave surface facing the screen side X1.

In the projection lens 130, a distance between lenses in each of the lens groups (including the first lens group G1, the second lens group G2, and the third lens group G3) is a constant, i.e. the distance between any two adjacent lenses in each of the lens groups is not varied along with a variation of a focal length of the projection lens 130. For example, in the first lens group G1, a distance between the first lens L1 and the second lens L2 is fixed, and a distance between the second lens L2 and the third lens L3 is fixed. In the second lens group G2, a distance between the fourth lens L4 and the fifth lens L5 is fixed, and the rest may be deduced by analogy. Moreover, the aforementioned distances refer to a straight-line distance between two adjacent surfaces on an optical axis A of the projection lens 130 respectively.

On the other hand, the distance between the lens groups of the embodiment is variable. For example, a distance D1 between the first lens group G1 and the second lens group G2 may be changed along with a variation of the distance D0 between the projection lens 130 and the screen SC. For example, when the distance D0 is decreased, the distance D1 is increased. On the other hand, when the distance D0 is increased, the distance D1 is decreased. Moreover, when the distance D0 between the projection lens 130 and the screen SC is a constant, the distance D1 between the first lens group G1 and the second lens group G2 and a distance D2 between the second lens group G2 and the third lens group G3 may be changed along with a size variation of an image projected on the screen SC by the projection lens 130. In the embodiment, the distance D2 between the second lens group G2 and the third lens group G3 at a wide-end is DWB, the distance D2 between the second lens group G2 and the third lens group G3 at a tele-end is DTB, and $15.5 < (DTB/DWB) < 18.5$.

Moreover, a distance D3 between the twelfth lens L12 and the light valve 120 is a constant, i.e. the distance D3 between the light valve 120 and the twelfth lens L12 closest to the light value 120 in the projection lens 130 is not changed along with a variation of a focal length. As shown in FIG. 1A to FIG. 1C, the distance D3 at the wide-end, the middle-end and the tele-end are all the same. Therefore, it is ensured that the third lens group G3 closest to the light valve 120 may completely cover the image beam L' coming from the light valve 120, so as to avoid a situation that a part of the image beam is propagated to other element(s) outside the lens group to cause overheating of the element(s) due to the outside element(s) absorbing the energy of the image beam in the prior art when the distance between the light valve and the lens group closest to the light valve is increased.

In the embodiment, the projection lens 130 may further include an aperture stop AS, wherein the aperture stop AS is disposed between the ninth lens L9 and the tenth lens L10. Moreover, a cover glass 140 may be disposed between the third lens group G3 and the light valve 120 to protect the light valve 120.

An implementation of the projection lens 130 is provided below. It should be noted that the data listed below is not used for limiting the invention, and those skilled in the art may suitably modify parameters or setting thereof without departing from the scope of the invention after referring the invention.

TABLE ONE

| Element | Surface | Radius of curvature (mm) | Distance (mm) | Refractive index | Abbe number |
|---|---|---|---|---|---|
| First lens L1 | S1 | 107.5 | 5.5 | 1.52 | 55.95 |
|  | S2 | 23.6 | 14.8 |  |  |
| Second lens L2 | S3 | −77.6 | 2.2 | 1.78 | 27.88 |
|  | S4 | 35.7 | 8.4 |  |  |

TABLE ONE-continued

| Element | Surface | Radius of curvature (mm) | Distance (mm) | Refractive index | Abbe number |
|---|---|---|---|---|---|
| Third lens L3 | S5 | 63.3 | 5.6 | 1.84 | 23.78 |
|  | S6 | −242.3 | D1 |  |  |
| Fourth lens L4 | S7 | 31.6 | 6.1 | 1.73 | 43.8 |
|  | S8 | ∞ | 0.1 |  |  |
| Fifth lens L5 | S9 | 37.6 | 3.2 | 1.82 | 37.43 |
|  | S10 | 70.8 | 5.5 |  |  |
| Sixth lens L6 | S11 | −171.5 | 1.3 | 1.64 | 33.9 |
| Seventh lens L7 | S12 | 10.6 | 5.7 | 1.53 | 45.4 |
|  | S13 | 90.3 | 0.18 |  |  |
| Eighth lens L8 | S14 | ∞ | 4.7 | 1.45 | 84.5 |
| Ninth lens L9 | S15 | −14.8 | 1.6 | 1.72 | 33.05 |
|  | S16 | ∞ | 2.7 |  |  |
| Aperture stop AS | S17 | ∞ | 0.1 | — | — |
| Tenth lens L10 | S18 | 191.8 | 4.4 | 1.53 | 44.75 |
|  | S19 | −18.1 | D2 |  |  |
| Eleventh lens L11 | S20 | 249.5 | 2.2 | 1.81 | 38.41 |
|  | S21 | −49.4 | 0.1 |  |  |
| Twelfth lens L12 | S22 | −45.5 | 1 | 1.81 | 25.24 |
|  | S23 | ∞ | 29.3 |  |  |
| Cover glass 140 | S24 | ∞ | 1.1 | 1.509 | 60.97 |
|  | S25 | ∞ | 0.7 |  |  |
| Light valve 120 | S26 | ∞ | — | — | — |

Referring to FIG. 1A and the table one, the table one lists the surfaces of the lenses (including the first lens L1 to the twelfth lens L12) and the cover glass 140. For example, the surface S1 is a surface of the first lens L1 facing the screen side X1, and the surface S2 is a surface of the first lens L1 facing the image side X2; the surface S17 is a plane where the aperture stop AS is located, and the surface S26 is a surface of the light valve 120 facing the screen side X1, and the rest may be deduced by analogy. Moreover, the distance refers to a straight-line distance on the optical axis A between two adjacent surfaces. For example, the distance corresponding to the surface S1 is the straight-line distance on the optical axis A between the surface S1 and the surface S2, and the distance corresponding to the surface S2 is the straight-line distance on the optical axis A between the surface S2 and the surface S3, and the rest may be deduced by analogy.

According to the above descriptions, in the embodiment, the sixth lens L6 and the seventh lens L7 construct a double cemented lens, and the eighth lens L8 and the ninth lens L9 construct another double cemented lens. Moreover, infinity (∞) of a radius of curvature of the surface refers to that the surface is a plane.

Moreover, the second lens L2 to the ninth lens L9, the eleventh lens L11, and the twelfth lens L12 may be spherical lenses, and the first lens L1 and the tenth lens L10 may be aspheric lenses. An equation of the aspheric lens is as follows.

$$X = \frac{Y^2}{R\left(1 + \sqrt{1-(1+k)*Y^2/R^2}\right)} + A_2Y^2 + A_4Y^4 + A_6Y^6 + A_8Y^8 + A_{10}Y^{10}...$$

In the above equation, X is a sag along a direction of the optical axis A, R is a radius of an osculating sphere, i.e. a radius of curvature close to the optical axis A (for example, the radius of curvature listed in the table one). k is a conic coefficient, Y is an aspheric height, i.e. a height from a center of a lens to an edge of the lens, and coefficients $A_2$, $A_4$, $A_6$, $A_8$, $A_{10}$ are aspheric coefficients. In the embodiment, the coefficient $A_2$ is 0. A following table two lists parameters of the surfaces S1 and S2 of the first lens L1 and the surfaces S18 and S19 of the tenth lens L10.

TABLE TWO

|  | S1 | S2 | S18 | S19 |
|---|---|---|---|---|
| k | 0 | 0 | 0 | 0 |
| A4 | 1.28E−05 | 1.10E−05 | −3.32E−05 | −6.92E−06 |
| A6 | −1.19E−08 | 1.24E−08 | −9.41E−08 | −1.25E−07 |
| A8 | 6.45E−12 | −6.31E−11 | 2.76E−11 | 5.57E−10 |
| A10 | 2.38E−16 | 5.57E−14 | −2.69E−11 | −2.66E−11 |

Moreover, the projection lens 130 may be a true zoom lens, i.e. when the projection lens 130 changes among the wide-end, the middle-end, and the tele-end, it may be unnecessary to additionally perform a focusing step. A following table three lists the distance D1 listed in the table one between the first lens group G1 and the second lens group G2 and the distance D2 listed in the table one between the second lens group G2 and the third lens group G3 under the situations of the wide-end, the middle-end, and the tele-end.

TABLE THREE

| Distance (mm) | Wide-end | Middle-end | Tele-end |
|---|---|---|---|
| D1 | 35.1 | 17.8 | 1 |
| D2 | 1 | 6.9 | 17.2 |

Figure 2A:
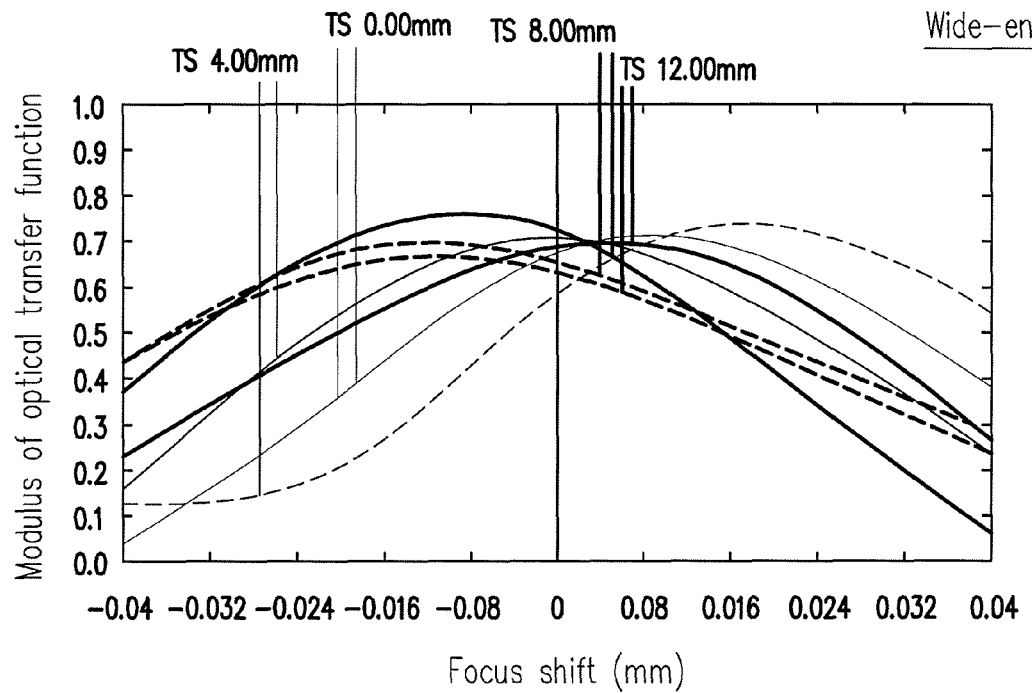
FIG. 2A to FIG. 2C are respectively modulation transfer function (MTF) curve diagrams of a projection lens of FIG. 1A to FIG. 1C.
Figure 2B:
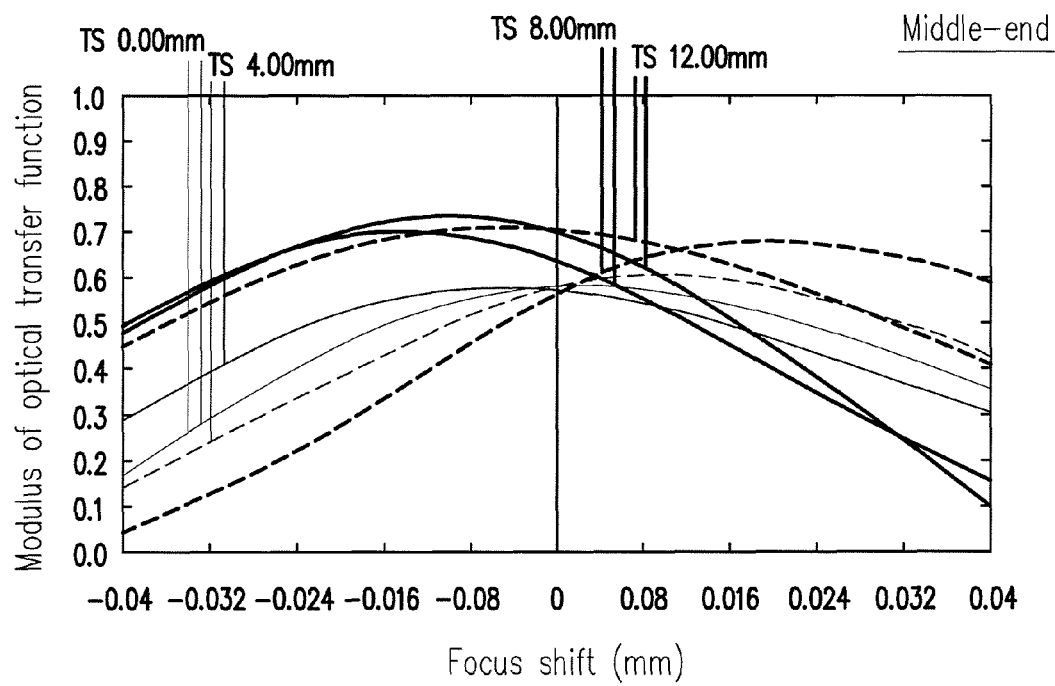
Figure 2C:
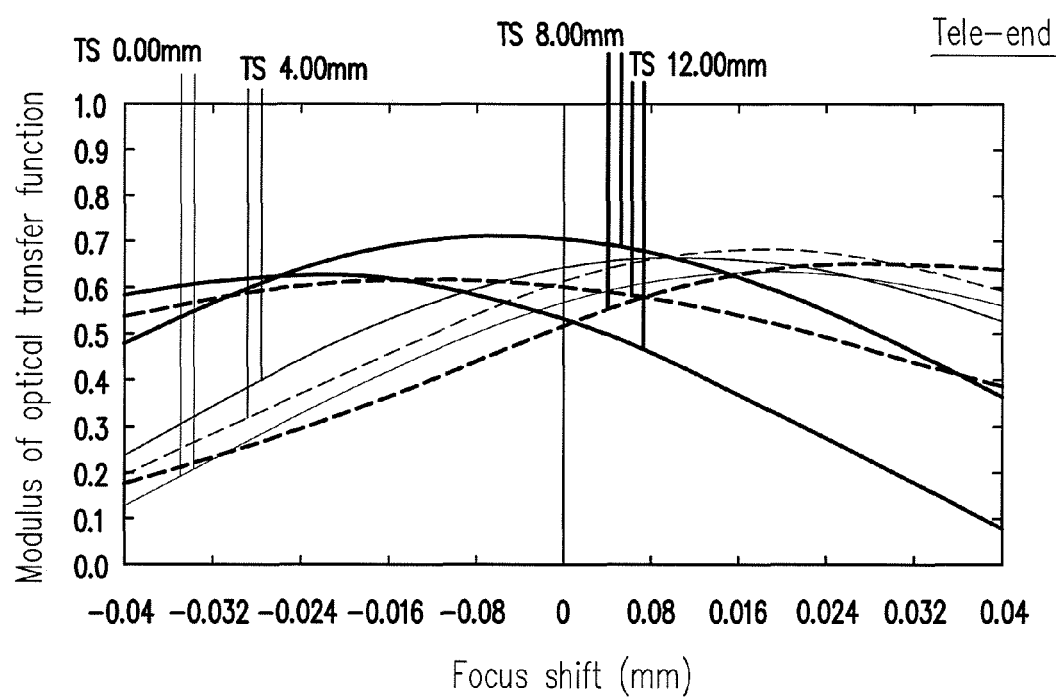
Figure 3A:
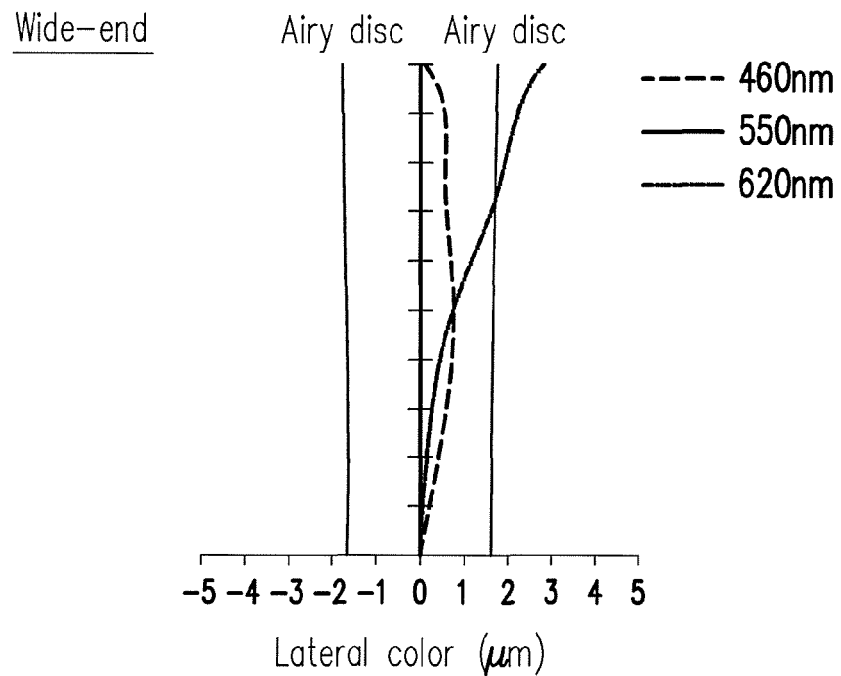
FIG. 3A to FIG. 3C are respectively lateral color diagrams of the projection lens of FIG. 1A to FIG. 1C.
Figure 3B:
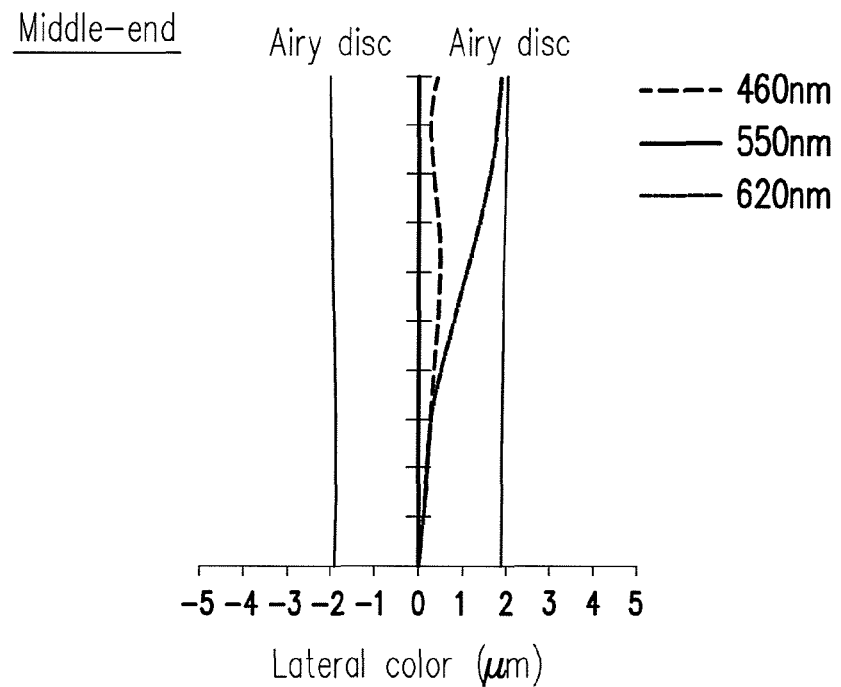
Figure 3C:
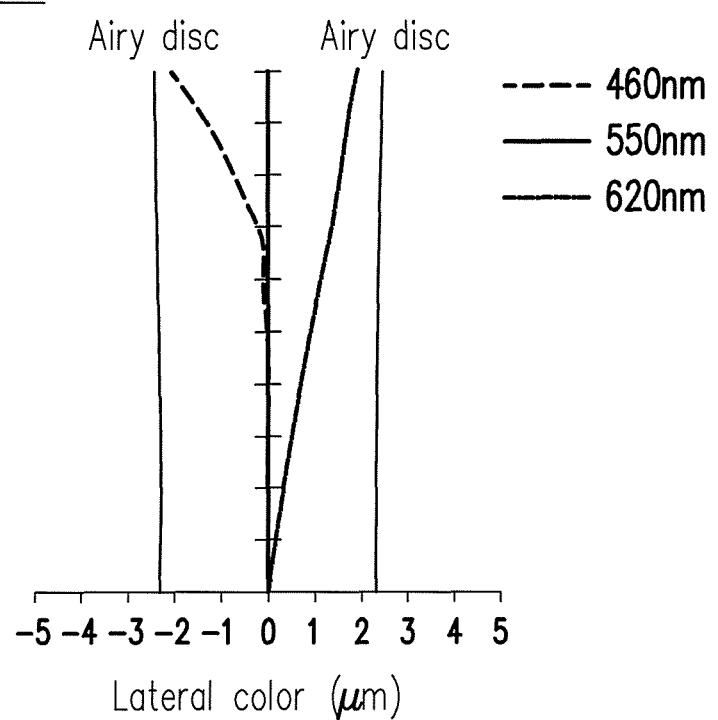
Figure 4A:
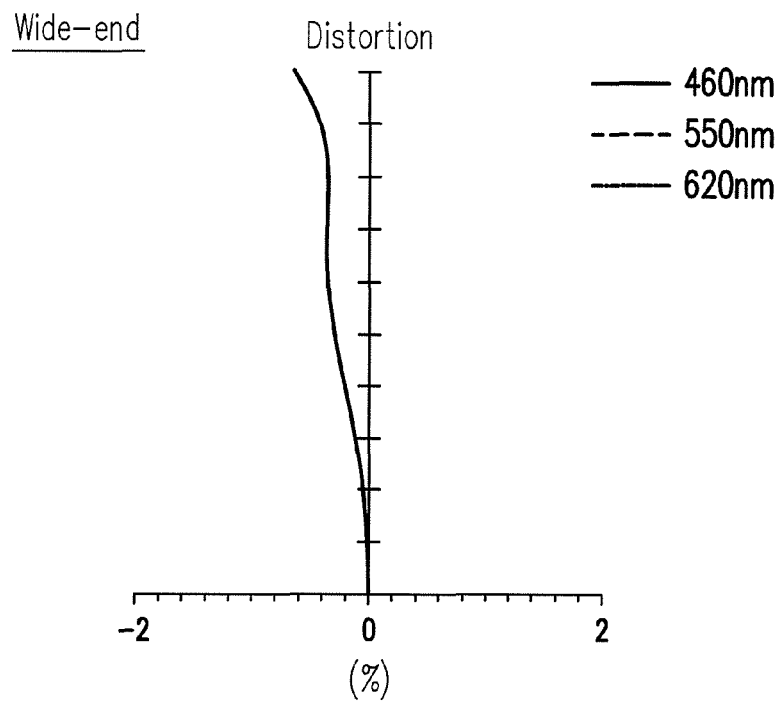
FIG. 4A to FIG. 4C are respectively distortion diagrams of the projection lens of FIG. 1A to FIG. 1C.
Figure 4B:
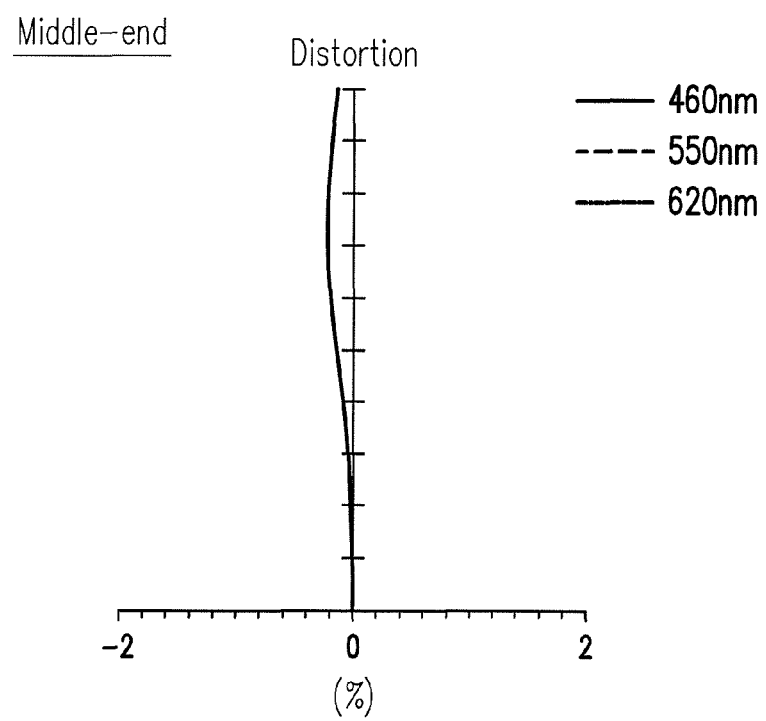
Figure 4C:
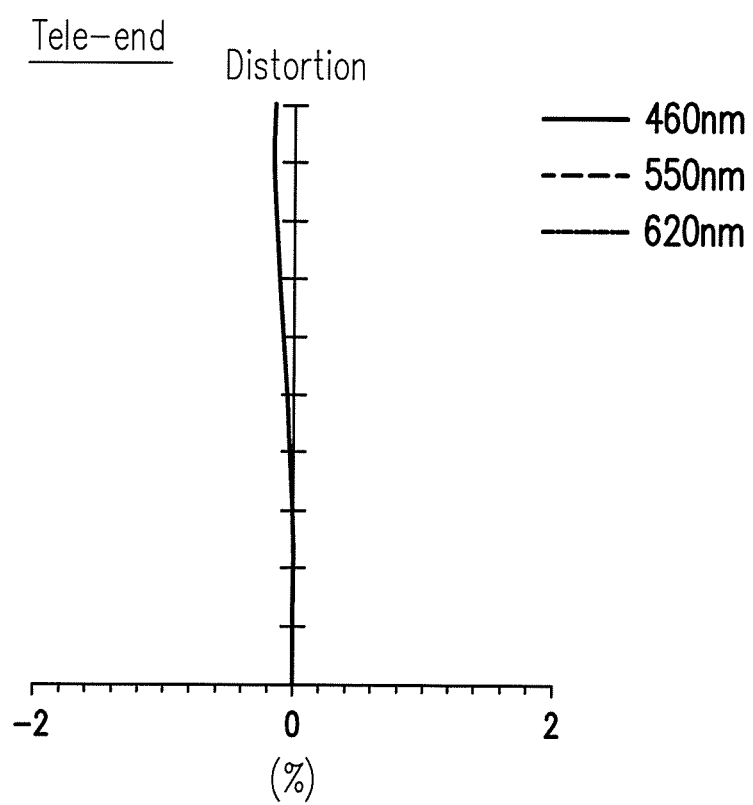
Figure 5A:
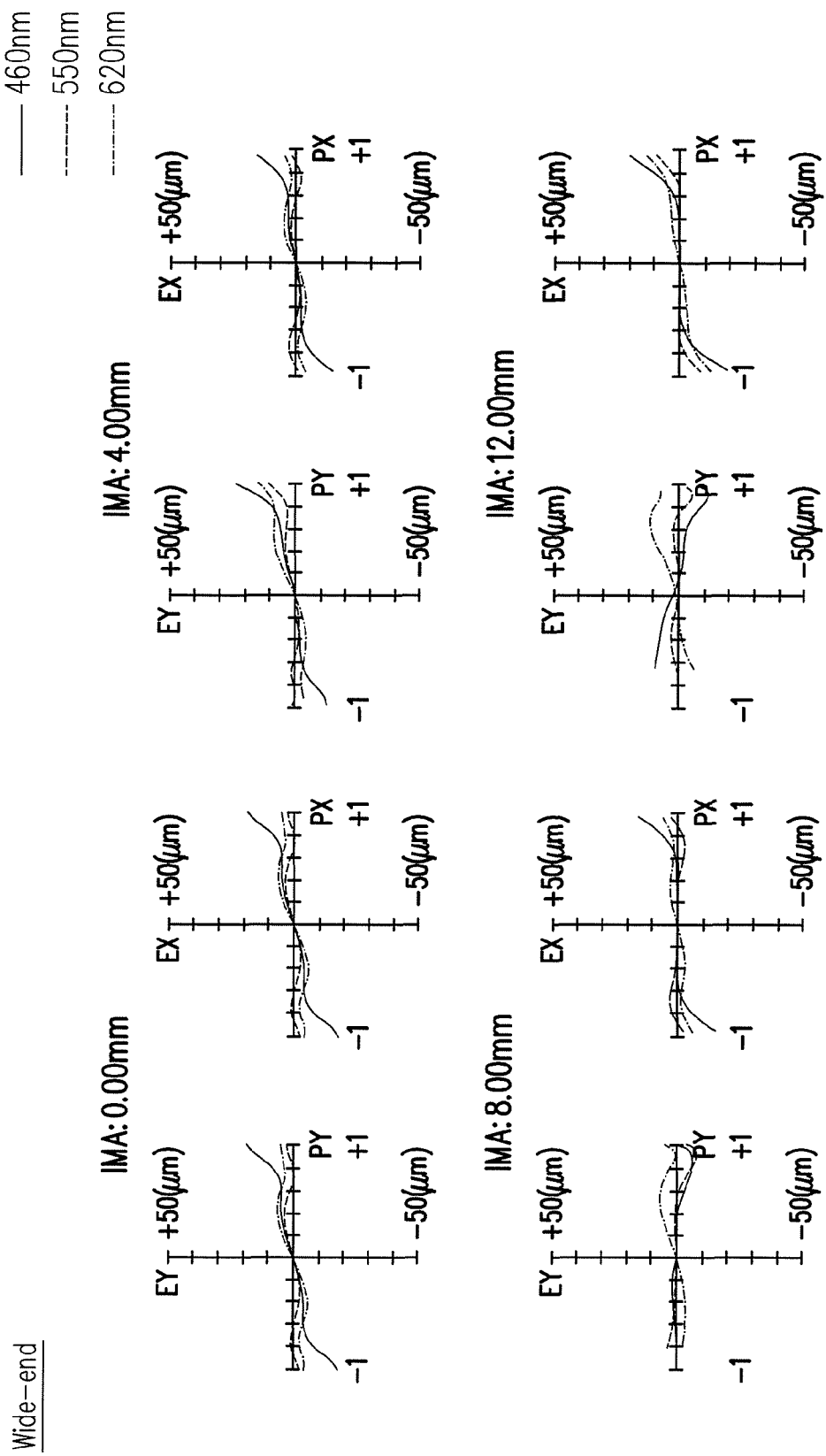
FIG. 5A to FIG. 5C are respectively transverse ray fan plots of the projection lens of FIG. 1A to FIG. 1C.
Figure 5B:
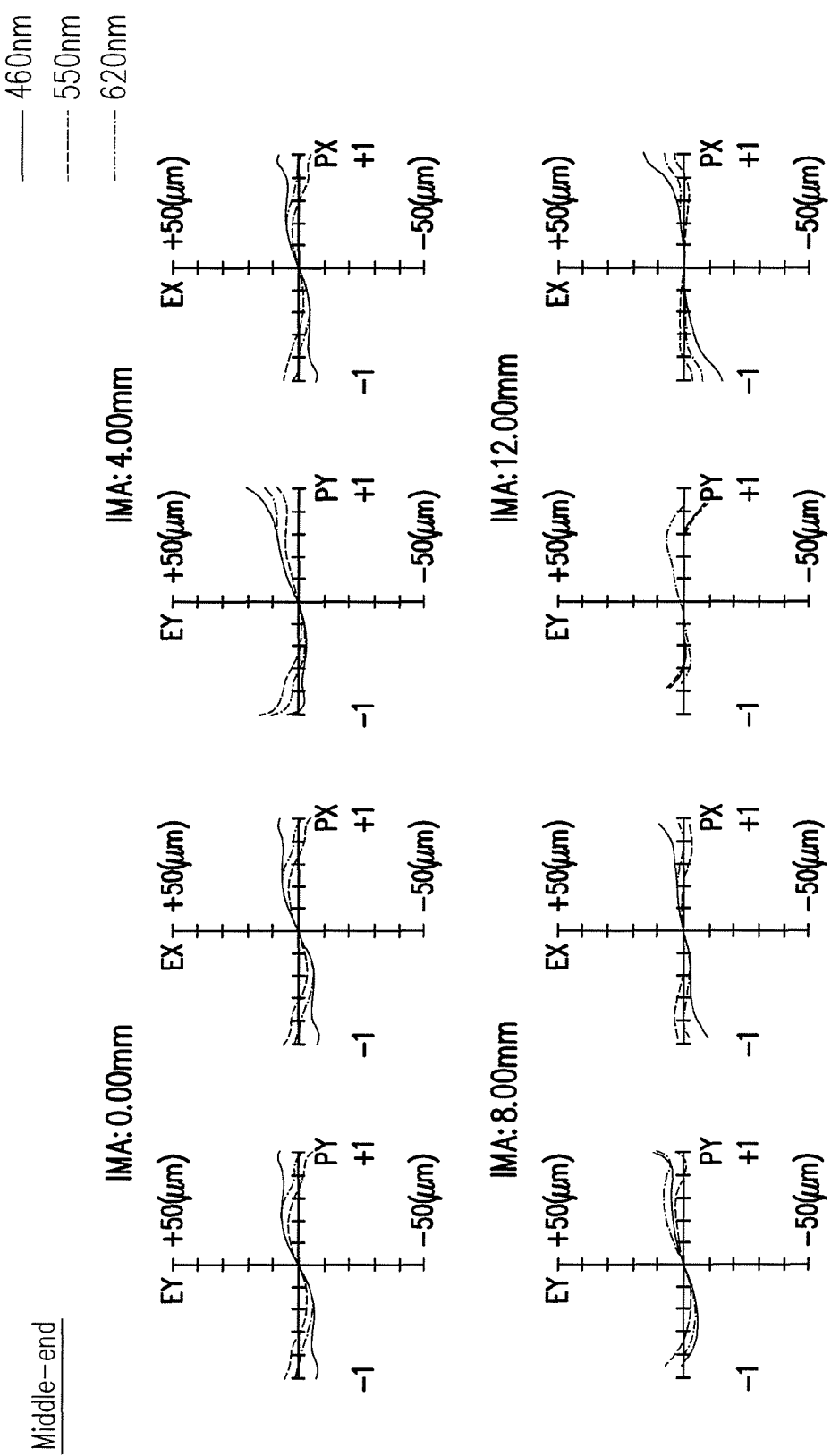
Figure 5C:
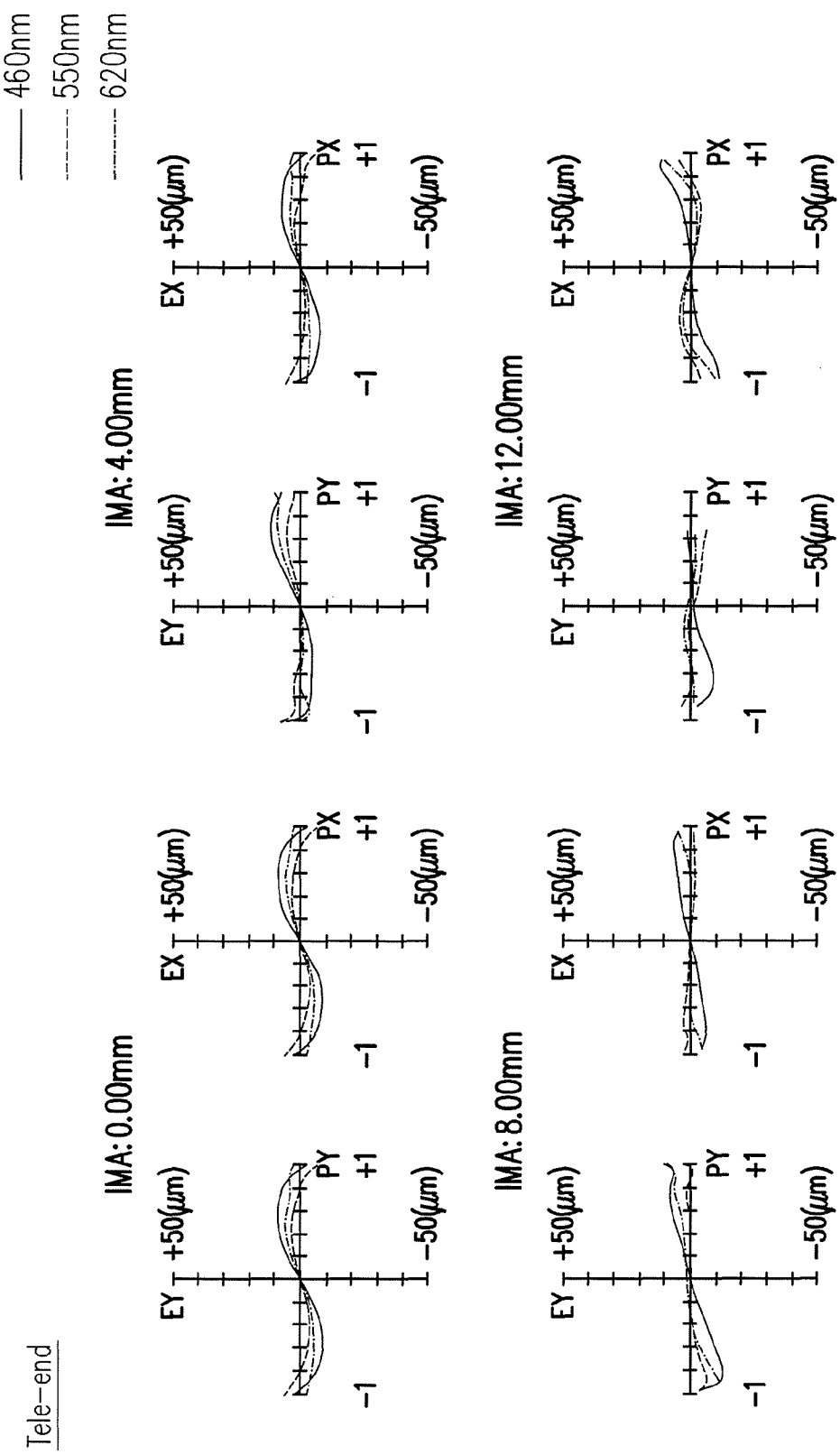

FIG. 2A to FIG. 2C are respectively modulation transfer function (MTF) curve diagrams of the projection lens of FIG. 1A to FIG. 1C, in which a horizontal axis represents a focus shift, and a vertical axis represents modulus of an optical transfer function (OTF). FIG. 3A to FIG. 3C are respectively lateral color diagrams of the projection lens of FIG. 1A to FIG. 1C, which are simulation data diagrams obtained by using lights with wavelengths of 460 nm, 550 nm, and 620 nm, in which a vertical axis represents airy disc. FIG. 4A to FIG. 4C are respectively distortion diagrams of the projection lens of FIG. 1A to FIG. 1C. FIG. 5A to FIG. 5C are respectively transverse ray fan plots of the projection lens of FIG. 1A to FIG. 1C, in which a maximum scale and a minimum scale of axes EX and EY are respectively +50 μm and −50 μm and a maximum scale and a minimum scale of axes PX and PY are respectively +1 and −1. The figures shown in FIG. 2A to FIG. 5C are all within a standard range, so that it is verified that the projection lens 130 of the embodiment may achieve a good imaging effect.

Figure 6A:
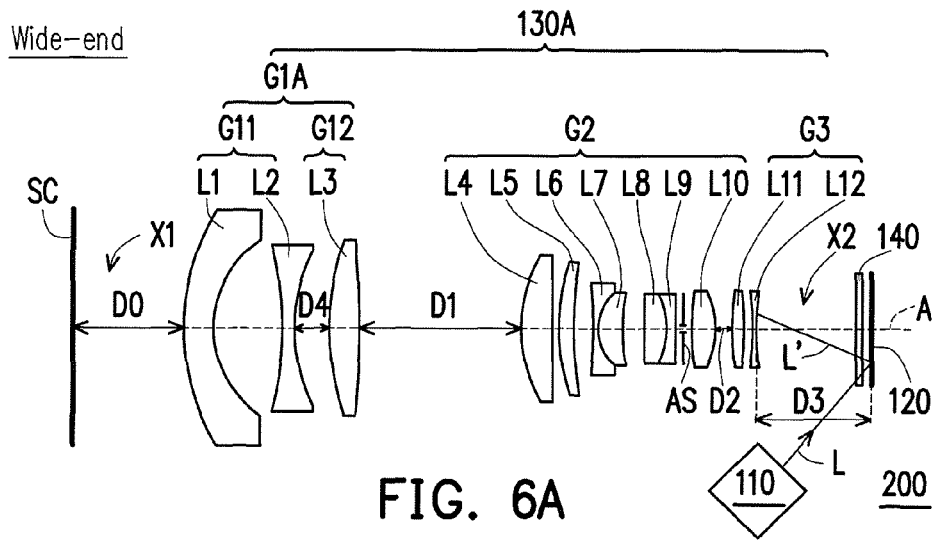
FIG. 6A to FIG. 6C are respectively schematic diagrams of a projection apparatus in a wide-end, a middle-end, and a tele-end according to a second embodiment of the invention.
Figure 6B:
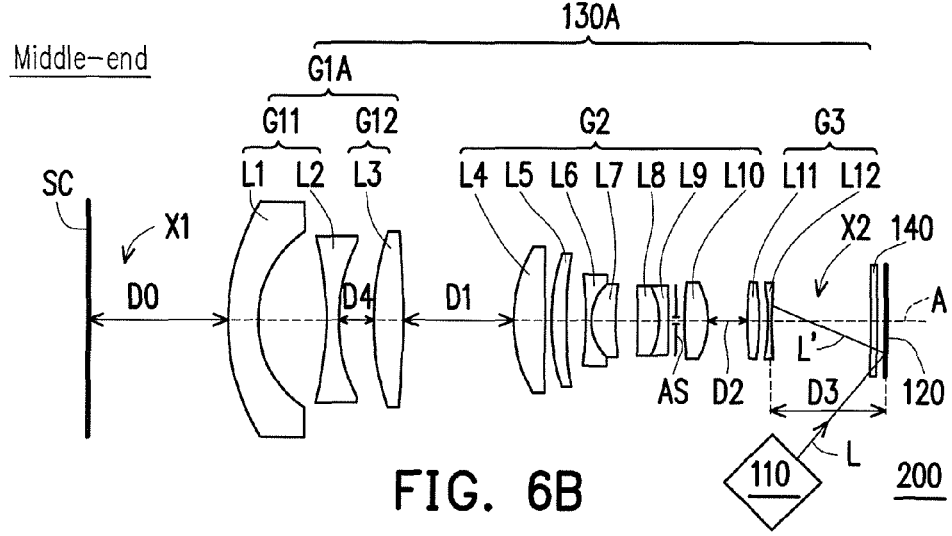
Figure 6C:
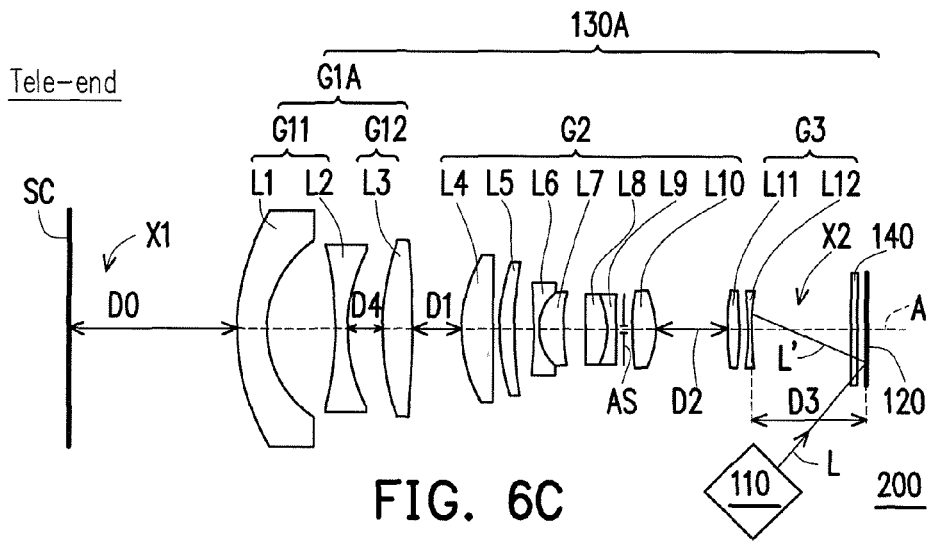

FIG. 6A to FIG. 6C are respectively schematic diagrams of a projection apparatus in a wide-end, a middle-end, and a tele-end according to a second embodiment of the invention. Retelling to FIG. 6A to FIG. 6C, the projection apparatus 200 is similar to the projection apparatus 100 of FIG. 1A to FIG. 1C, and the same or similar elements are denoted by the same referential numbers, and functions, types and relative configuration relationship of the elements are not repeated. A main difference between the projection apparatus 200 and the projection apparatus 100 lies in different designs of the projection lens. Specifically, in the projection lens 130A, a first lens group G1A of the embodiment includes a first sub-lens group G11 and a second sub-lens group G12. In the embodiment, the first sub-lens group G11 is composed of the first lens L1 and the second lens L2, the second sub-lens group G12 is composed of the third lens L3, and refractive powers of the first sub-lens group G11 and the second sub-lens group G12 are sequentially negative and positive.

Under such architecture, a distance D4 between the first sub-lens group G11 and the second sub-lens group G12 may be varied along with a variation of the distance D0 between the projection lens 200 and the screen SC. Moreover, when the distance D0 between the projection lens 200 and the screen SC is a constant, the distance D4 between the first sub-lens group G11 and the second sub-lens group G12, a distance between the second sub-lens group G12 and the second lens group G2 (i.e. the distance D1 between the first lens group G1 and the second lens group G2), and the distance D2 between the second lens group G2 and the third lens group G3 may be changed along with a size variation of an image projected on the screen SC by the projection lens 200. Moreover, in the embodiment, the distance D2 between the second lens group G2 and the third lens group G3 at the wide-end is DWA, the distance D2 between the second lens group G2 and the third lens group G3 at the tele-end is DTA, and 15.2<(DTA/DWA)<18.

The distance D3 between the twelfth lens L12 and the light valve 120 is a constant, i.e. the distance D3 between the light valve 120 and the twelfth lens L12 closest to the light valve 120 is not changed along with a variation of the focal length. As shown in FIG. 6A to FIG. 6C, the distance D3 at the wide-end, the middle-end, and the tele-end are all the same. Therefore, it is ensured that the third lens group G3 closest to the light valve 120 may completely cover the image beam L' coming from the light valve 120, so as to avoid a situation that a part of the image beam is propagated to other element(s) outside the lens group as the distance between the light valve and the lens group closest to the light valve is increased to cause overheating of the element(s) due to that the element(s) absorbs the energy of the light beam in the prior art.

An implementation of the projection lens 130A is provided below. It should be noted that the data listed below is not used for limiting the invention, and those skilled in the art may suitably modify parameters or setting thereof without departing from the scope of the invention after referring the invention.

TABLE FOUR

| Element | Surface | Radius of curvature (mm) | Distance (mm) | Refractive index | Abbe number |
|---|---|---|---|---|---|
| First lens L1 | S1 | 95.5 | 5.5 | 1.525 | 55.95 |
|  | S2 | 23.5 | 14.7 |  |  |
| Second lens L2 | S3 | −87.6 | 2.2 | 1.798 | 33.03 |
|  | S4 | 37.1 | D4 |  |  |
| Third lens L3 | S5 | 76 | 4.8 | 1.846 | 23.77 |
|  | S6 | −278.6 | D1 |  |  |
| Fourth lens L4 | S7 | 31.5 | 6.6 | 1.742 | 43.16 |
|  | S8 | ∞ | 0.1 |  |  |
| Fifth lens L5 | S9 | 37.6 | 3.4 | 1.834 | 37.16 |
|  | S10 | 78.8 | 6.1 |  |  |
| Sixth lens L6 | S11 | −139.5 | 1.3 | 1.649 | 33.89 |
| Seventh lens L7 | S12 | 10.4 | 5.5 | 1.526 | 46.61 |
|  | S13 | 100.2 | 0.7 |  |  |
| Eighth lens L8 | S14 | ∞ | 3.6 | 1.447 | 92.11 |
| Ninth lens L9 | S15 | −14.8 | 1 | 1.724 | 29.93 |
|  | S16 | ∞ | 3.5 |  |  |
| Aperture stop AS | S17 | ∞ | 0.1 | — | — |
| Tenth lens L10 | S18 | 169.2 | 4.2 | 1.523 | 47.31 |
|  | S19 | −18.3 | D2 |  |  |
| Eleventh lens L11 | S20 | 122.6 | 2.4 | 1.819 | 37.93 |
|  | S21 | −42 | 0.1 |  |  |

TABLE FOUR-continued

| Element | Surface | Radius of curvature (mm) | Distance (mm) | Refractive index | Abbe number |
|---|---|---|---|---|---|
| Twelfth lens L12 | S22 | −38.8 | 1 | 1.803 | 36.32 |
|  | S23 | 279.2 | 29.3 |  |  |
| Cover glass 140 | S24 | ∞ | 1.1 | 1.509 | 60.97 |
|  | S25 | ∞ | 0.7 |  |  |
| Light valve 120 | S26 | ∞ | — | — | — |

Descriptions of each of the elements in the table four may refer related description of the table one, and details thereof are not repeated. In the embodiment, the twelfth lens L12 is a biconcave lens, and surface characteristics of the first lens L1 to the eleventh lens L11 may refer to the first embodiment, though the invention is not limited thereto. Moreover, in the embodiment, the second lens L2 to the ninth lens L9, the eleventh lens L11, and the twelfth lens L12 are spherical lenses, and the first lens L1 and the tenth lens L10 are aspheric lenses. The equation of the aspheric lens may refer to the first embodiment. In the embodiment, the coefficient A2 is also 0. A following table five lists parameters of the surfaces S1 and S2 of the first lens L1 and the surfaces S18 and S19 of the tenth lens L10.

TABLE FIVE

|  | S1 | S2 | S18 | S19 |
|---|---|---|---|---|
| k | 0 | 0 | 0 | 0 |
| A4 | 1.19E−05 | 9.99E−06 | −3.14E−05 | −7.64E−06 |
| A6 | −1.22E+00 | 6.57E−09 | −7.82E−08 | −1.04E−07 |
| A8 | 7.72E−12 | −6.14E−11 | −1.13E−11 | 3.57E−10 |
| A10 | −3.27E−16 | 6.06E−14 | −2.43E−11 | −2.48E−11 |

Moreover, the projection lens 130A may also be a true zoom lens, i.e. when the projection lens 130A changes among the wide-end, the middle-end, and the tele-end, it may be unnecessary to additionally perform a focusing step. A following table six lists the distance D4 listed in the table four between the first sub-lens group G11 and the second sub-lens group G12, the distance D1 listed in the table four between the second sub-lens group G12 and the second lens group G2, and the distance D2 listed in the table four between the second lens group G2 and the third lens group G3 under the situations of the wide-end, the middle-end and the tele-end.

TABLE SIX

| Distance (mm) | Wide-end | Middle-end | Tele-end |
|---|---|---|---|
| D4 | 6.2 | 7.8 | 9.7 |
| D1 | 37.4 | 20.1 | 1 |
| D2 | 1 | 6.9 | 16.9 |

Figure 7A:
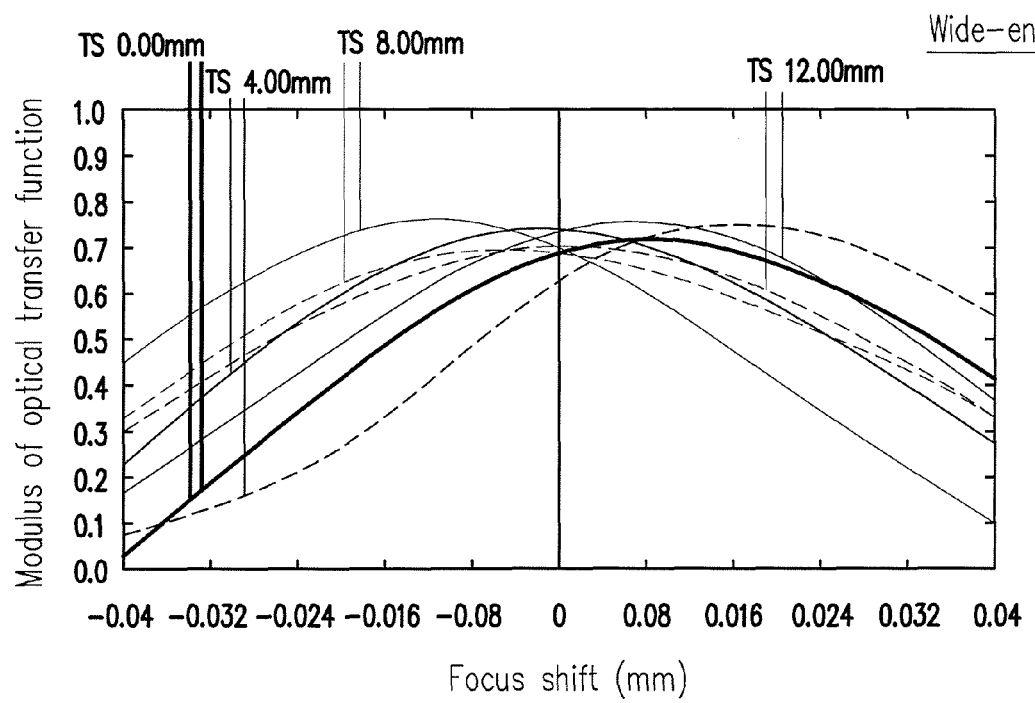
FIG. 7A to FIG. 7C are respectively modulation transfer function (MTF) curve diagrams of a projection lens of FIG. 6A to FIG. 6C.
Figure 7B:
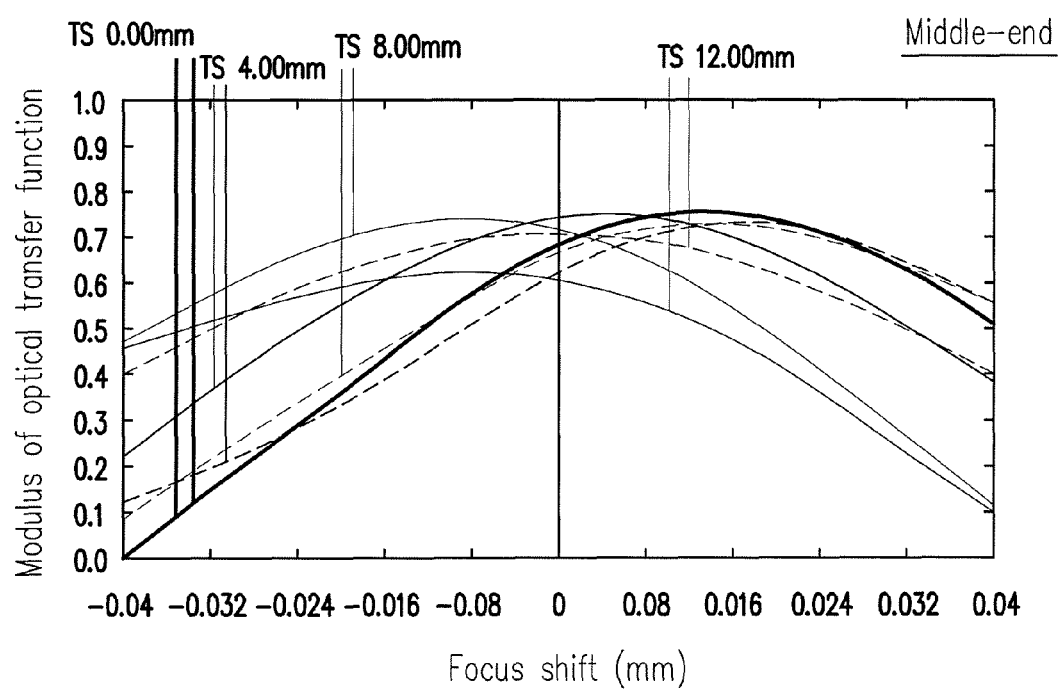
Figure 7C:
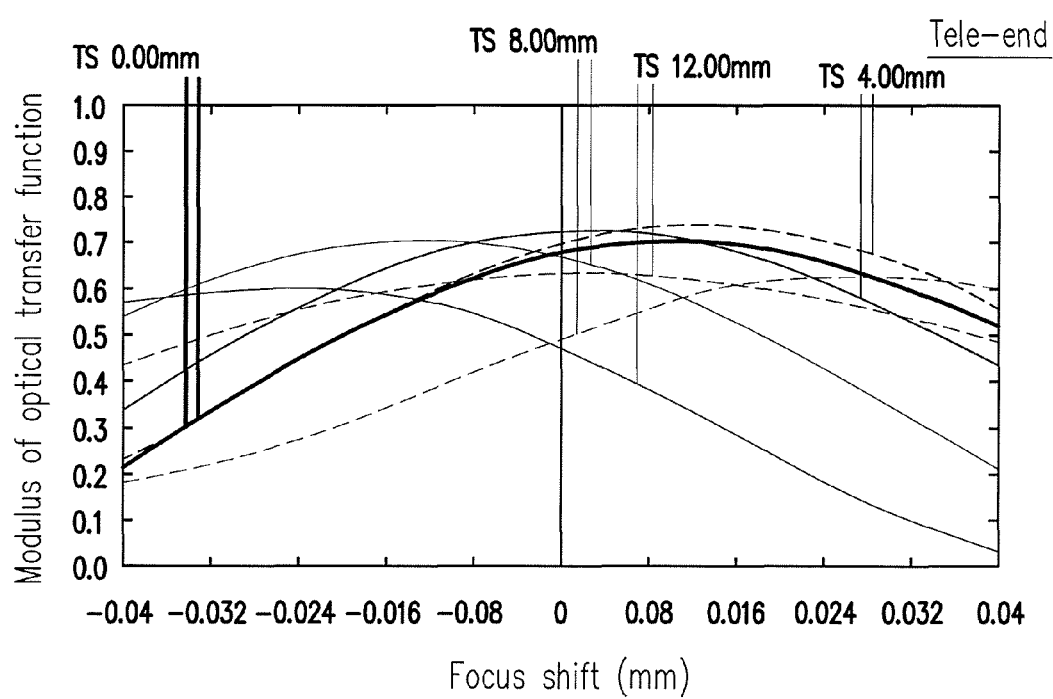
Figure 8A:
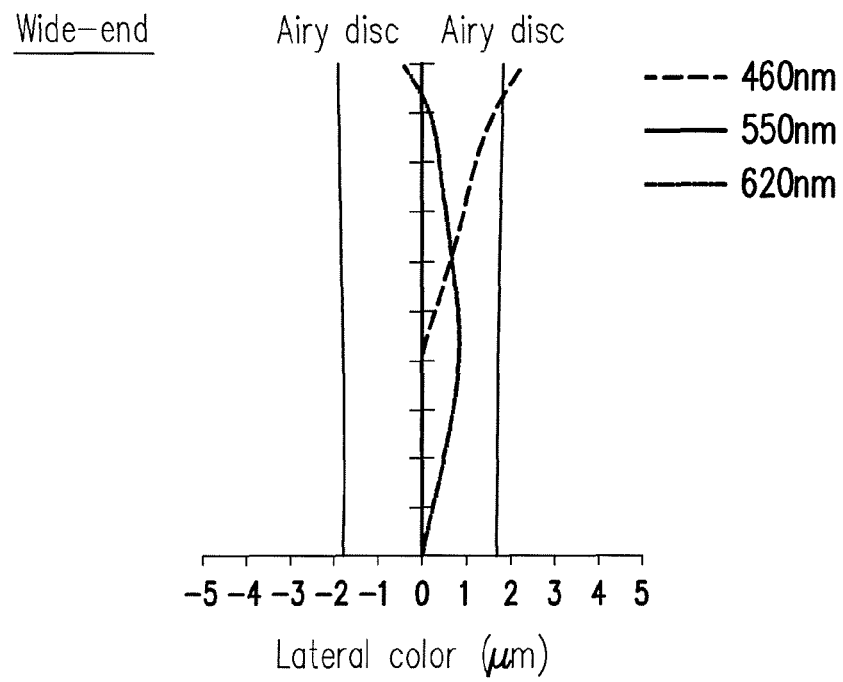
FIG. 8A to FIG. 8C are respectively lateral color diagrams of the projection lens of FIG. 6A to FIG. 6C.
Figure 8B:
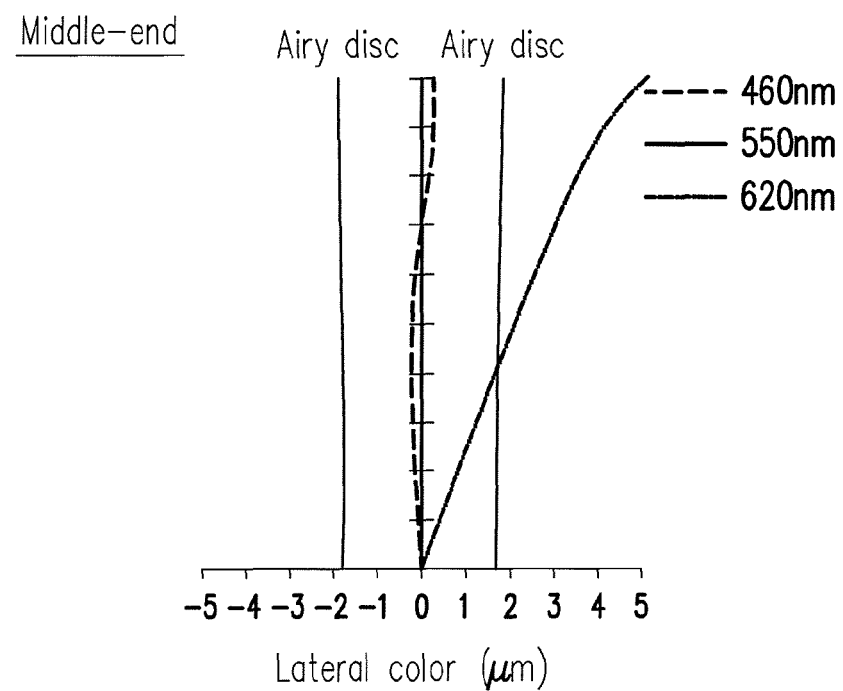
Figure 8C:
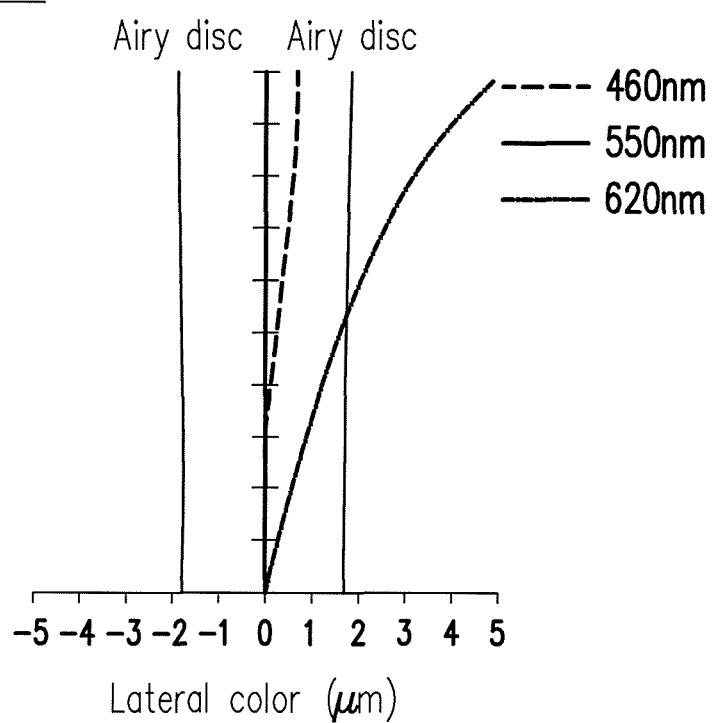
Figure 9A:
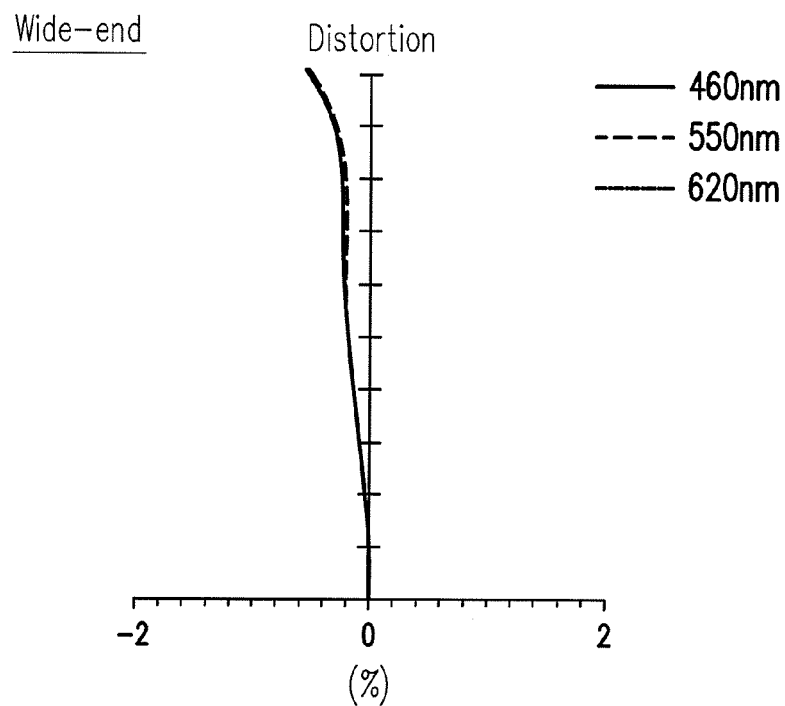
FIG. 9A to FIG. 9C are respectively distortion diagrams of the projection lens of FIG. 6A to FIG. 6C.
Figure 9B:
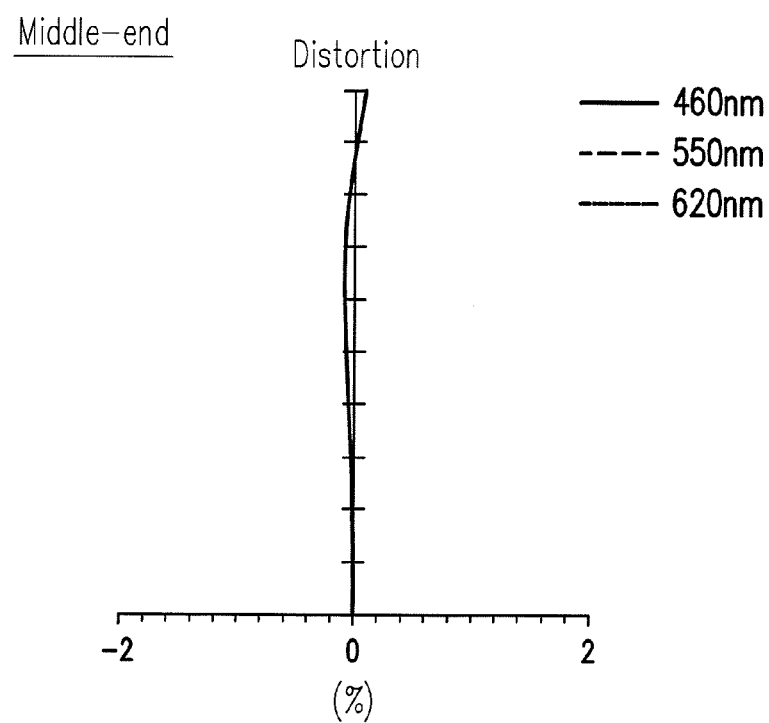
Figure 9C:
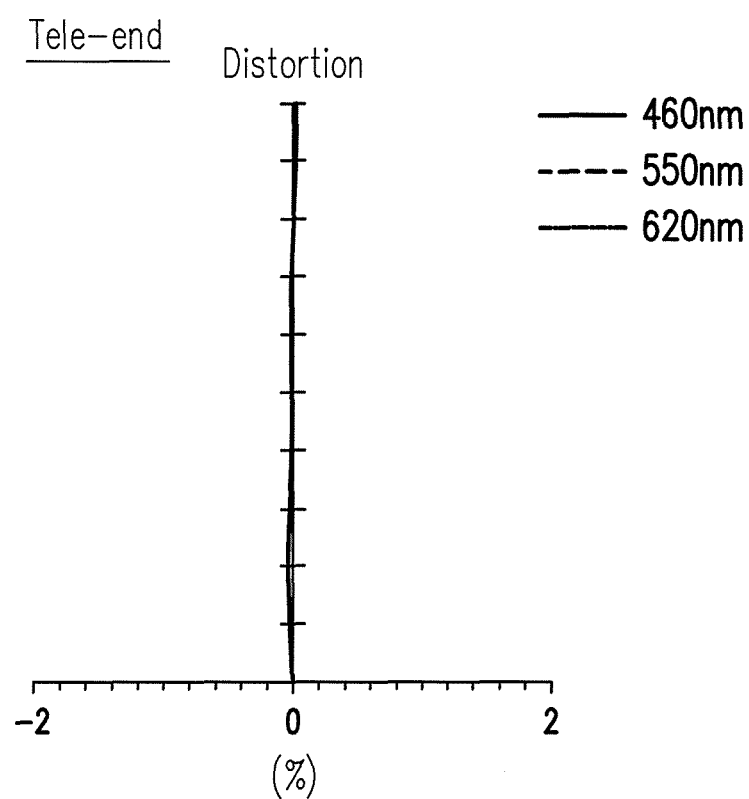
Figure 10A:
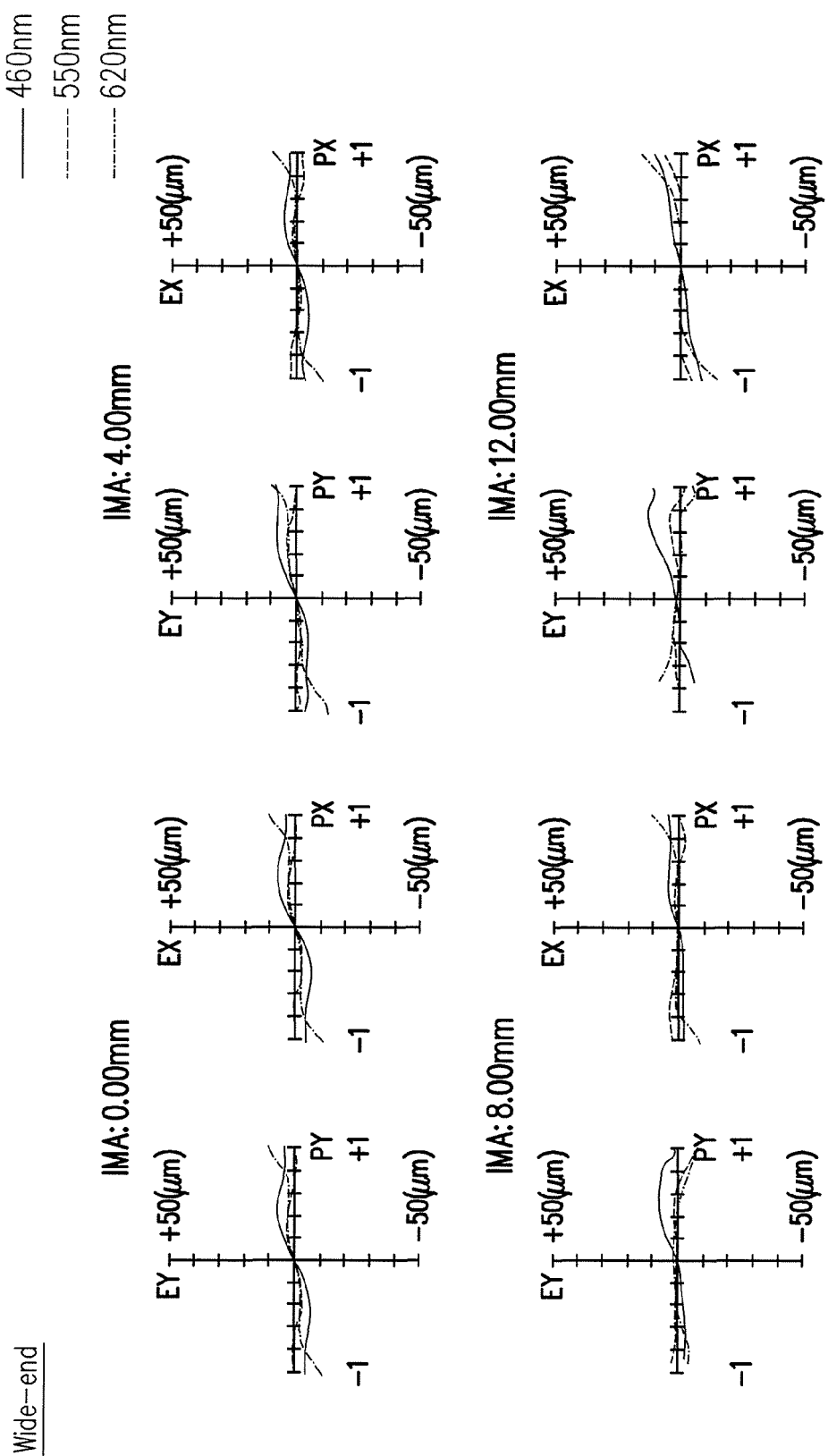
FIG. 10A to FIG. 10C are respectively transverse ray fan plots of the projection lens of FIG. 6A to FIG. 6C.
Figure 10B:
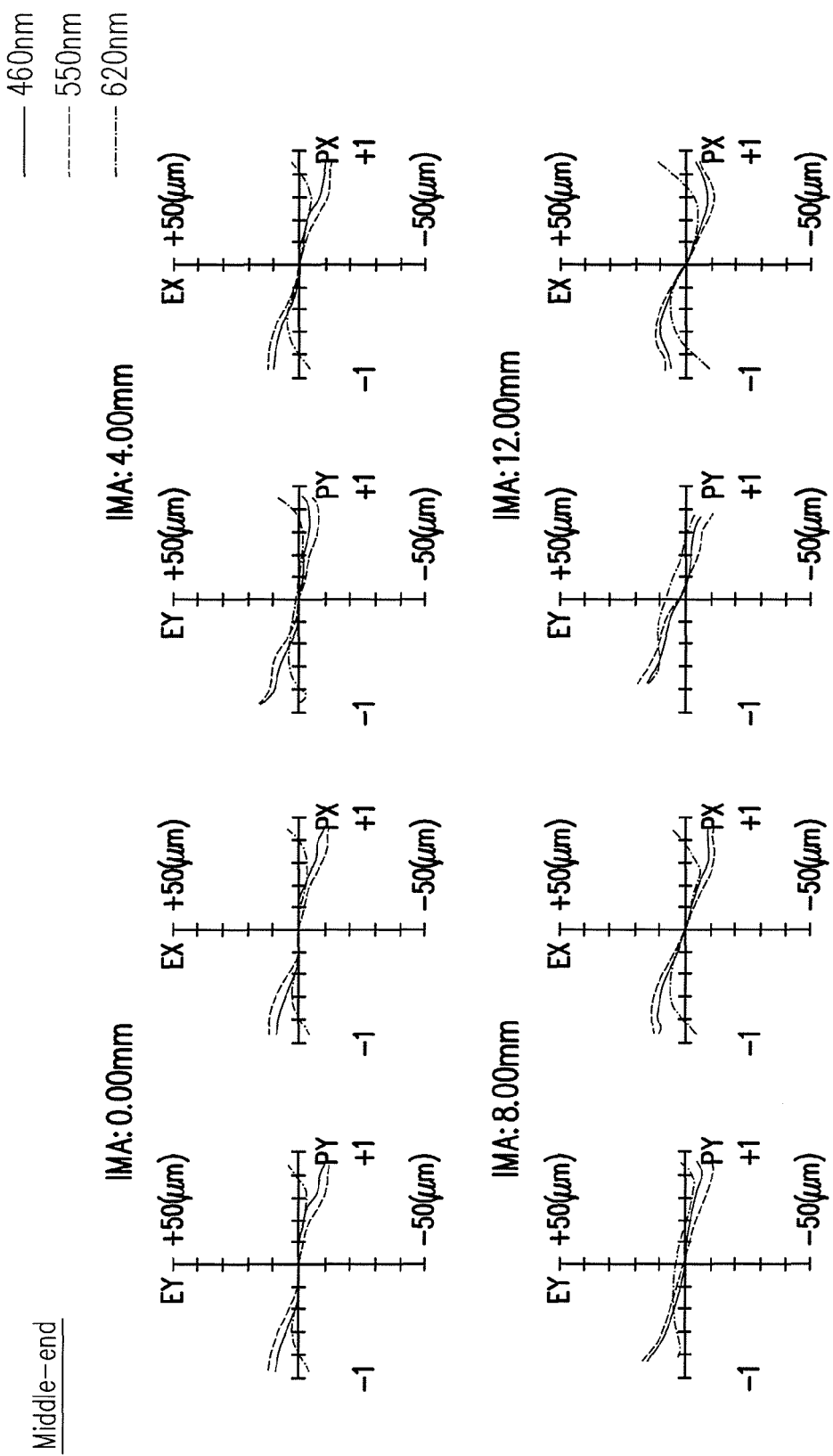
Figure 10C:
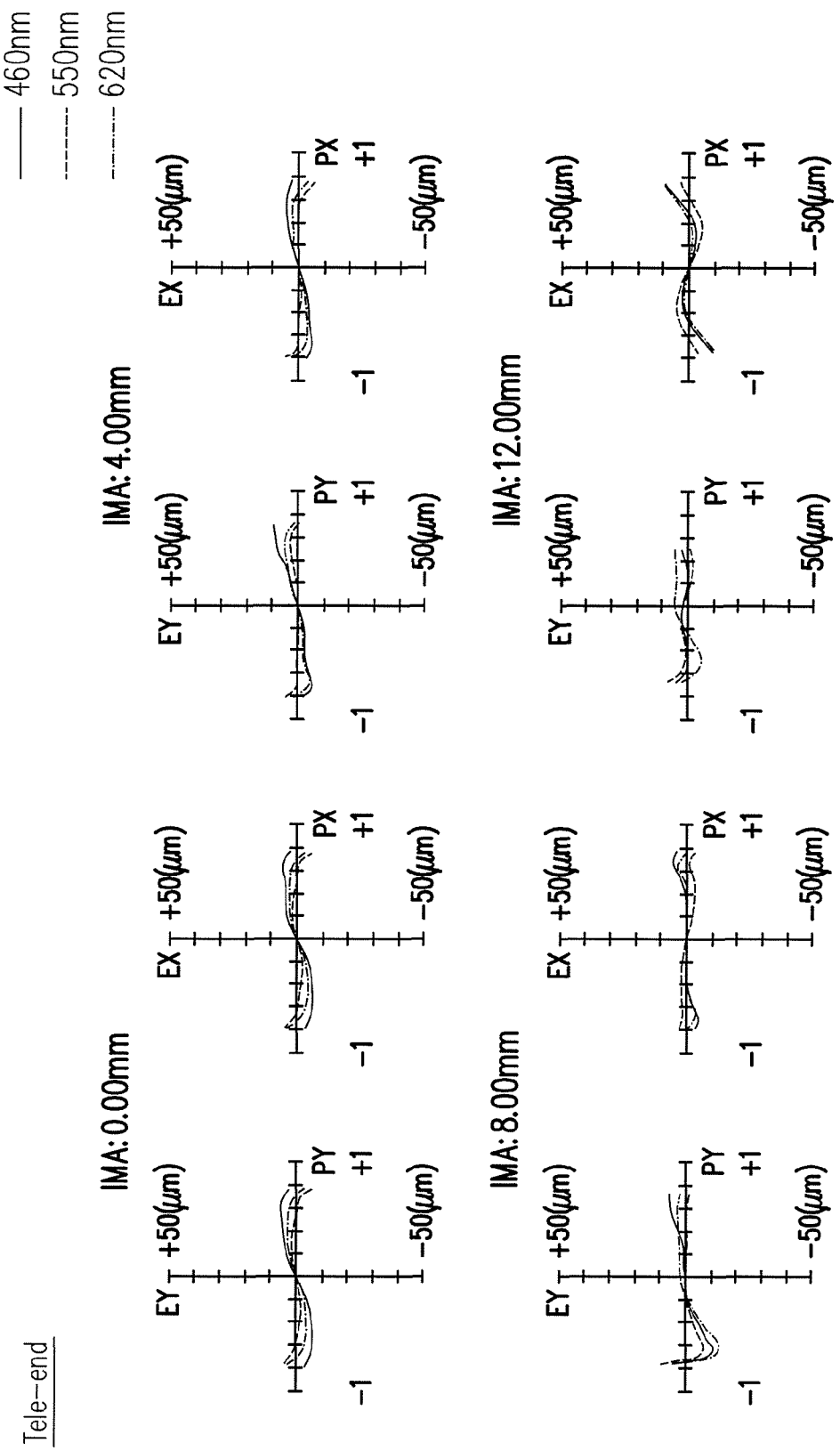

FIG. 7A to FIG. 7C are respectively modulation transfer function (MTF) curve diagrams of the projection lens of FIG. 6A to FIG. 6C. FIG. 8A to FIG. 8C are respectively lateral color diagrams of the projection lens of FIG. 6A to FIG. 6C. FIG. 9A to FIG. 9C are respectively distortion diagrams of the projection lens of FIG. 6A to FIG. 6C. FIG. 10A to FIG. 10C are respectively transverse ray fan plots of the projection lens of FIG. 6A to FIG. 6C. The figures shown in FIG. 7A to FIG. 10C are all within a standard range, so that it is verified that the projection lens 130A of the embodiment may achieve a good imaging effect.

In summary, the embodiment of the invention may achieve at least one of the following advantages or effects. In the embodiments of the invention, the distance between the light valve and the twelfth lens closest to the light valve is maintained to a constant. Therefore, during a zooming process, it is ensured that the lens group (the third lens group) closest to the image source in the projection lens may completely cover the image beam coming from the image source, so as to avoid a situation that the element(s) outside the lens group in the projection apparatus absorbs the energy of the image beam to cause a problem of overheating of element(s).

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   an illumination system, providing an illumination beam;
   a light valve, disposed on a transmission path of the illumination beam, and converting the illumination beam into an image beam; and
   a projection lens, disposed on a transmission path of the image beam, and having a screen side and an image side, and the projection lens comprising:
      a first lens group, disposed between the screen side and the image side, wherein the first lens group comprises a first lens, a second lens, and a third lens arranged sequentially from the screen side to the image side, and refractive powers of the first lens, the second lens, and the third lens are sequentially negative, negative, and positive;
      a second lens group, disposed between the first lens group and the image side and having a positive refractive power, wherein the second lens group comprises a fourth lens, a fifth lens, a sixth lens, a seventh lens, an eighth lens, a ninth lens, and a tenth lens arranged sequentially from the screen side to the image side, and refractive powers of the fourth lens, the fifth lens, the sixth lens, the seventh lens, the eighth lens, the ninth lens, and the tenth lens are sequentially positive, positive, negative, positive, positive, negative, and positive; and
      a third lens group, disposed between the second lens group and the image side and having a positive refractive power, wherein the third lens group comprises an eleventh lens and a twelfth lens arranged sequentially from the screen side to the image side, refractive powers of the eleventh lens and the twelfth lens are sequentially positive and negative, and a distance between the twelfth lens and the light valve is a constant, wherein a distance between the second lens group and the third lens group at a wide-end is DW, a distance between the second lens group and the third lens group at a tele-end is DT, and $15.5 < (DT/DW) < 18.5$.

2. The projection apparatus as claimed in claim 1, wherein the first lens group comprises a first sub-lens group and a second sub-lens group, the first sub-lens group is composed of the first lens and the second lens, the second sub-lens group is composed of the third lens, and refractive powers of the first sub-lens group and the second sub-lens group are sequentially negative and positive.

3. The projection apparatus as claimed in claim 2, wherein $15.5 < (DT/DW) < 18$.

4. The projection apparatus as claimed in claim 1, wherein the first lens group has a negative refractive power.

5. The projection apparatus as claimed in claim 1, wherein the first lens is a convexo-concave lens with a convex surface facing the screen side, the second lens is a biconcave lens, the third lens is a biconvex lens, the fourth lens is a plano-convex lens with a convex surface facing the screen side, the fifth lens is a convexo-concave lens with a convex surface facing the screen side, the sixth lens is a biconcave lens, the seventh lens is a convexo-concave lens with a convex surface facing the screen side, the eighth lens is a plano-convex lens with a convex surface facing the image side, the ninth lens is a plano-concave lens with a concave surface facing the screen side, the tenth lens is a biconvex lens, the eleventh lens is a biconvex lens, and the twelfth lens is a biconcave lens or a plano-concave lens with a concave surface facing the screen side.

6. The projection apparatus as claimed in claim 1, wherein the sixth lens and the seventh lens construct a double cemented lens, and the eighth lens and the ninth lens construct another double cemented lens.

7. The projection apparatus as claimed in claim 1, wherein the first lens and the tenth lens are aspheric lenses, and the second lens to the ninth lens, the eleventh lens, and the twelfth lens are spherical lenses.

8. The projection apparatus as claimed in claim 1, wherein the projection lens further comprises an aperture stop disposed between the ninth lens and the tenth lens.

9. A projection lens, adapted to be disposed on a transmission path of an image beam from a light valve and having a screen side and an image side, the projection lens comprising:
- a first lens group, disposed between the screen side and the image side, wherein the first lens group comprises a first lens, a second lens, and a third lens arranged sequentially from the screen side to the image side, and refractive powers of the first lens, the second lens, and the third lens are sequentially negative, negative, and positive;
- a second lens group, disposed between the first lens group and the image side and having a positive refractive power, wherein the second lens group comprises a fourth lens, a fifth lens, a sixth lens, a seventh lens, an eighth lens, a ninth lens, and a tenth lens arranged sequentially from the screen side to the image side, and refractive powers of the fourth lens, the fifth lens, the sixth lens, the seventh lens, the eighth lens, the ninth lens, and the tenth lens are sequentially positive, positive, negative, positive, positive, negative, and positive; and
- a third lens group, disposed between the second lens group and the image side and having a positive refractive power, wherein the third lens group comprises an eleventh lens and a twelfth lens arranged sequentially from the screen side to the image side, refractive powers of the eleventh lens and the twelfth lens are sequentially positive and negative, and a distance between the twelfth lens and the light valve is a constant wherein a distance between the second lens group and the third lens group at a wide-end is DW, a distance between the second lens group and the third lens group at a tele-end is DT, and 15.5<(DT/DW)<18.5.

10. The projection lens as claimed in claim 9, wherein the first lens group comprises a first sub-lens group and a second sub-lens group, the first sub-lens group is composed of the first lens and the second lens, the second sub-lens group is composed of the third lens, and refractive powers of the first sub-lens group and the second sub-lens group are sequentially negative and positive.

11. The projection lens as claimed in claim 10, wherein 15.5<(DT/DW)<18.

12. The projection lens as claimed in claim 9, wherein the first lens group has a negative refractive power.

13. The projection lens as claimed in claim 9, wherein the first lens is a convexo-concave lens with a convex surface facing the screen side, the second lens is a biconcave lens, the third lens is a biconvex lens, the fourth lens is a plano-convex lens with a convex surface facing the screen side, the fifth lens is a convexo-concave lens with a convex surface facing the screen side, the sixth lens is a biconcave lens, the seventh lens is a convexo-concave lens with a convex surface facing the screen side, the eighth lens is a plano-convex lens with a convex surface facing the image side, the ninth lens is a plano-concave lens with a concave surface facing the screen side, the tenth lens is a biconvex lens, the eleventh lens is a biconvex lens, and the twelfth lens is a biconcave lens or a plano-concave lens with a concave surface facing the screen side.

14. The projection lens as claimed in claim 9, wherein the sixth lens and the seventh lens construct a double cemented lens, and the eighth lens and the ninth lens construct another double cemented lens.

15. The projection lens as claimed in claim 9, wherein the first lens and the tenth lens are aspheric lenses, and the second lens to the ninth lens, the eleventh lens, and the twelfth lens are spherical lenses.

16. The projection lens as claimed in claim 9, further comprising:
- an aperture stop, disposed between the ninth lens and the tenth lens.

* * * * *